US012222094B1

(12) United States Patent
Zhang et al.

(10) Patent No.: US 12,222,094 B1
(45) Date of Patent: Feb. 11, 2025

(54) LED GROW LIGHT WITH COLD LIGHT SOURCE

(71) Applicant: Shenzhen Longood Intelligent Electric Co., Ltd, Shenzhen (CN)

(72) Inventors: Yujie Zhang, Shenzhen (CN); Zhigao Chen, Shenzhen (CN); Min Tang, Shenzhen (CN); Yiling Zheng, Shenzhen (CN)

(73) Assignee: Shenzhen Longood Intelligent Electric Co., Ltd, Shenzhen (CN)

( * ) Notice: Subject to any disclaimer, the term of this patent is extended or adjusted under 35 U.S.C. 154(b) by 0 days.

(21) Appl. No.: 18/533,382

(22) Filed: Dec. 8, 2023

(30) Foreign Application Priority Data

Nov. 13, 2023 (CN) ......................... 202323061894.9
Nov. 13, 2023 (CN) ......................... 202323076971.8

(51) Int. Cl.
*F21V 29/67* (2015.01)
*F21V 29/70* (2015.01)
*F21Y 113/20* (2016.01)

(52) U.S. Cl.
CPC .............. *F21V 29/67* (2015.01); *F21V 29/70* (2015.01); *F21Y 2113/20* (2016.08)

(58) Field of Classification Search
CPC ........ F21V 29/67; F21V 29/70; F21V 23/002; F21V 23/006; F21V 23/008; F21V 23/023; F21V 23/026; F21V 29/503; F21V 29/673; F21V 29/677; F21V 29/763; F21Y 2113/20; F21Y 2105/16; A01G 9/249
See application file for complete search history.

(56) References Cited

U.S. PATENT DOCUMENTS 9,964,288 B1 * 5/2018 Stefanoff .................. F21K 9/20
10,794,548 B2 * 10/2020 Powell .................... F21K 9/272
11,655,948 B2 * 5/2023 Parker ................... F21V 17/104
362/217.01
RE49,637 E * 8/2023 Kinnune ................ H05B 45/24
315/193
2017/0105265 A1 * 4/2017 Sadwick ................ H05B 47/11
(Continued)

FOREIGN PATENT DOCUMENTS

CN 203395754 U * 1/2014
CN 207514683 U 6/2018
CN 212178821 U 12/2020
(Continued)

*Primary Examiner* — Zheng Song
*Assistant Examiner* — Glenn D Zimmerman
(74) *Attorney, Agent, or Firm* — Nitin Kaushik

(57) ABSTRACT

Disclosed is a LED grow light with a cold light source, including a cold light source body fixed on a lamp support of a HID lamp, and an electronic ballast and two wiring lamp holders are arranged on the lamp support. The cold light source body includes a cold light source and a heat sink, and the heat sink includes a housing and side cover plates located at both ends of the housing. Heat dissipation channels are formed in the housing, and a plurality of heat dissipation fins are arranged on the housing. An end cover is installed at an input welding spot, screw holes are machined at the top of the housing, each screw hole is connected to a screw rod that penetrates through the fixed support and is fastened and connected by means of a screw, and the fixed support is further connected to the lamp support.

10 Claims, 11 Drawing Sheets

(56) References Cited

U.S. PATENT DOCUMENTS

| | | | | |
|---|---|---|---|---|
| 2020/0355327 | A1* | 11/2020 | Deely | H05B 47/12 |
| 2022/0053707 | A1* | 2/2022 | de Wet | F21V 9/40 |

FOREIGN PATENT DOCUMENTS

| | | | | |
|---|---|---|---|---|
| CN | 216982708 | U | | 7/2022 |
| KR | 2020085134 | A | * | 7/2020 |
| KR | 10-2244649 | B1 | * | 4/2021 |

* cited by examiner

LED GROW LIGHT WITH COLD LIGHT SOURCE

CROSS-REFERENCE TO RELATED APPLICATIONS

The application claims priority to Chinese patent application No. 2023230618949 and No. 2023230769718, filed on Nov. 13, 2023, the entire contents of which are incorporated herein by reference.

TECHNICAL FIELD

The present disclosure relates to the technical field of local improved design of lamps, and particularly relates to a light-emitting diode (LED) grow light with a cold light source.

BACKGROUND

Mercury lamps, sodium lamps, gold lamps and xenon lamps are collectively referred to as high intensity discharge (HID) lamps. Brightness of a HID lamp is three times that of a conventional halogen bulb, and service life of the HID lamp is 10 times longer than that of the conventional halogen bulb. Due to the advantages of high brightness, a long service life and the like, the HID lamps are not only used in automotive lighting equipment, but also can be applied to the systems of fire emergency lighting, military-police field lighting, ship navigation at night, locomotive lighting, primary nighttime lighting of industrial buildings, civilian lightweight portable lighting, and so on.

It is well known that the HID lamps will release a large amount of heat. When a HID lamp is in a high temperature state for a long time or has poor heat dissipation effect, normal operation of an adjacent control circuit will be affected, so that its performance and service life will be further affected. Currently there are no HID cold light source bodies available on the market and there are few options in powers of HID bulbs, that is, only 1000 W for high-pressure sodium (HPS) lamps and 600 W and 350 W for ceramic metal halide (CMH) lamps are available. Furthermore, existing HID bulb-type light sources, due to the characteristics of glass covers, are prone to explosion and cracking, and have a short service life and a high operating temperature, resulting in that direct use of them as grow lights is limited to some extent.

In the prior art, the Chinese Patent with Publication No. CN203099727U discloses a simple-installation combined-type light emitting diode (LED) lamp support. When the lamp support is used, only a fixing stand needs to be fixed through a fixing ring, and then a fixed concave circular groove of a lamp supporting body is aligned to a fixing tenon bar of the fixing stand, so that the fixing tenon bar slides into the fixed concave circular groove, and finally a connection tenon bar of a lamp holder fixed with a LED lamp is aligned to and slides into a connecting concave circular groove of the lamp supporting body, such that the lamp holder is fixed on the lamp supporting body. Compared with the prior art, a sliding insertion connection manner is adopted to relatively fix the lamp supporting body and the fixing stand, and the lamp support is designed with a hollow structure and can be combined with a heat dissipation device. However, the lamp supporting body configured to fix the LED lamp is assembled by matching a lamp holder connection tenon bar with a concave circular groove for lamp holder connection on the lamp supporting body. However, such design cannot meet the requirements for grow lights, especially for replacing HID cold light sources.

The Chinese Patent with Publication No. CN116669250A discloses a multifunctional industrial cold light source. The multifunctional industrial cold light source includes a main control module, a LED light set and a drive module, where the main control module controls switching on/off of the LED light set through the drive module. The multifunctional industrial cold light source further includes: fans, configured for heat dissipation of the LED light set and electrically connected with the main control module, where the main control module is capable to control switching on/off of the fans; and a temperature sensor, electrically connected with the main control module, where the main control module is capable to detect the temperature of the LED light set through the temperature sensor, and the main control module is capable to control rotating speeds of the fans and/or the number of the working fans according to the detected temperature.

As mentioned in the above technical solution, the fans are used for heat dissipation of the LED light set, and corresponding cooling control is achieved by adjusting the rotating speeds of the fans and/or the number of the working fans, but design of an entire heat dissipation structure is not specifically illustrated, particularly including assembly or layout design of the lamp housing and heat sink assemblies.

To solve one of the above problems, the present disclosure provides a LED grow light with a cold light source.

SUMMARY

In order to solve the problems existing in the prior art, the present disclosure provides a light-emitting diode (LED) grow light with a cold light source. The LED grow light, in combination with a heat dissipation design of a heat sink and a structure of connection between a fixed support and the heat sink, is capable to be compatible with existing HID lamps. The cold light source body has the characteristics of low heat, fast heat dissipation, stable performance, and the like.

To achieve the objective described above, the present disclosure provides the technical solution as follows: a LED grow light with a cold light source, including a cold light source body; the cold light source body is fixed on a lamp support of a high intensity discharge (HID) lamp, and an electronic ballast and two wiring lamp holders are arranged on the lamp support; the cold light source body includes a cold light source and a heat sink, where the cold light source includes lamp panels provided with a plurality of LED beads and wires, and the wires extend outward to the wiring lamp holders and are electrically connected to the electronic ballast; and the heat sink includes a housing and side cover plates located at both ends of the housing; heat dissipation channels are formed on the housing, a plurality of heat dissipation fins are arranged on the housing, and the lamp panel is fixed at the bottom of the housing; and an end cover is installed at an input welding spot of the lamp panel, screw holes are machined at the top of the housing, each screw hole is connected to a screw rod, the screw rod penetrates through the fixed support and is fastened and connected by means of a screw, and the fixed support is further connected to the lamp support.

Further, the side cover plates are first side cover plates, and through holes are machined on the first side cover plates.

Further, the side cover plates are second side cover plates, through holes and first ventilation openings are machined on the second side cover plates, and the first ventilation openings and the heat dissipation channels are matched in positions and sizes.

Further, the side cover plates are third side cover plates, through holes and first vent holes are machined on the third side cover plates, the first vent holes and the heat dissipation channels are matched in positions, and suction fans and/or exhaust fans are fixed on the third side cover plates at both ends of the heat dissipation channel, where the suction fans and the exhaust fans are electrically connected to a power supply assembly, and the power supply assembly are located between the heat dissipation fins.

Further, the side cover plates are fourth side cover plates, through holes, second vent holes and second ventilation openings are machined on the fourth side cover plates, the second vent holes and the heat dissipation channels are matched in positions, and suction fans and/or exhaust fans are fixed on the fourth side cover plates at both ends of the heat dissipation channel, where the suction fans and the exhaust fans are electrically connected to a power supply assembly, and the second ventilation openings and the power supply assembly are matched in installation positions.

Further, the housing is composed of two half housings that are symmetrically arranged and spliced together, and the two half housings are enclosed to form an open slot through at both ends, where the power supply assembly is installed in the open slot.

Further, the half housings are provided with a plurality of C-shaped grooves, and the side cover plates and the power supply assembly are connected at the bottom through threads or riveted to the C-shaped grooves.

Further, the half housings are provided with the heat dissipation channels with a combination of rectangular and trapezoidal cross-section shapes, and the heat dissipation fins are plate elements or strip-shaped blocks that extend side by side along inside and outside of the half housings.

Further, the power supply assembly is provided with an upper cover plate, and the upper cover plate and the top of the housing are slidably connected and fixed by abutting against two side cover plates; and an end cover is installed in a middle part of the lamp panel.

Further, the fixed support is connected to a middle part of the lamp support; and the two wiring lamp holders arc respectively located on both sides of the heat sink, and either of the two lamp panels is provided with two wires that extend outward respectively and are in fit with the wiring lamp holders in an inserted manner.

Compared with the prior art, the present disclosure has the following beneficial effects: the LED grow light in the present disclosure replaces a lamp body of an existing HID lamp with a LED lamp, the fixed support is connected on the basis of the lamp support of the existing HID lamp, the wires are placed in the wiring lamp holders to electrically connect the electronic ballast for power supply, a structure of connection between the fixed support and the heat sink, and the LED grow light, in combination with a heat dissipation design of the heat sink and a structure of connection between the fixed support and the heat sink, is capable to be compatible with existing HID lamps.

The cold light source body has the characteristics of low heat, fast heat dissipation, stable performance, and the like. Specifically, the lamp panel is installed at the bottom of the heat sink with the heat dissipation fins to meet the heat dissipation needs, the end cover protects the input welding spot, and the side cover plates can be provided with the fans to assist in heat dissipation and achieve the cold light effect: under the condition that the size of the lamp is fixed, the lamp panel (lamp bead layout) can be replaced to meet different power requirements and heat dissipation needs; and an aluminum heat sink is used for basic heat dissipation, a high-speed heat conduction and transfer structure is formed by adding exhaust fans, the suction fans, the enclosed heat dissipation channels and the heat dissipation fins, and the forced heat dissipation system design can achieve the cold light effect.

Figure 1:
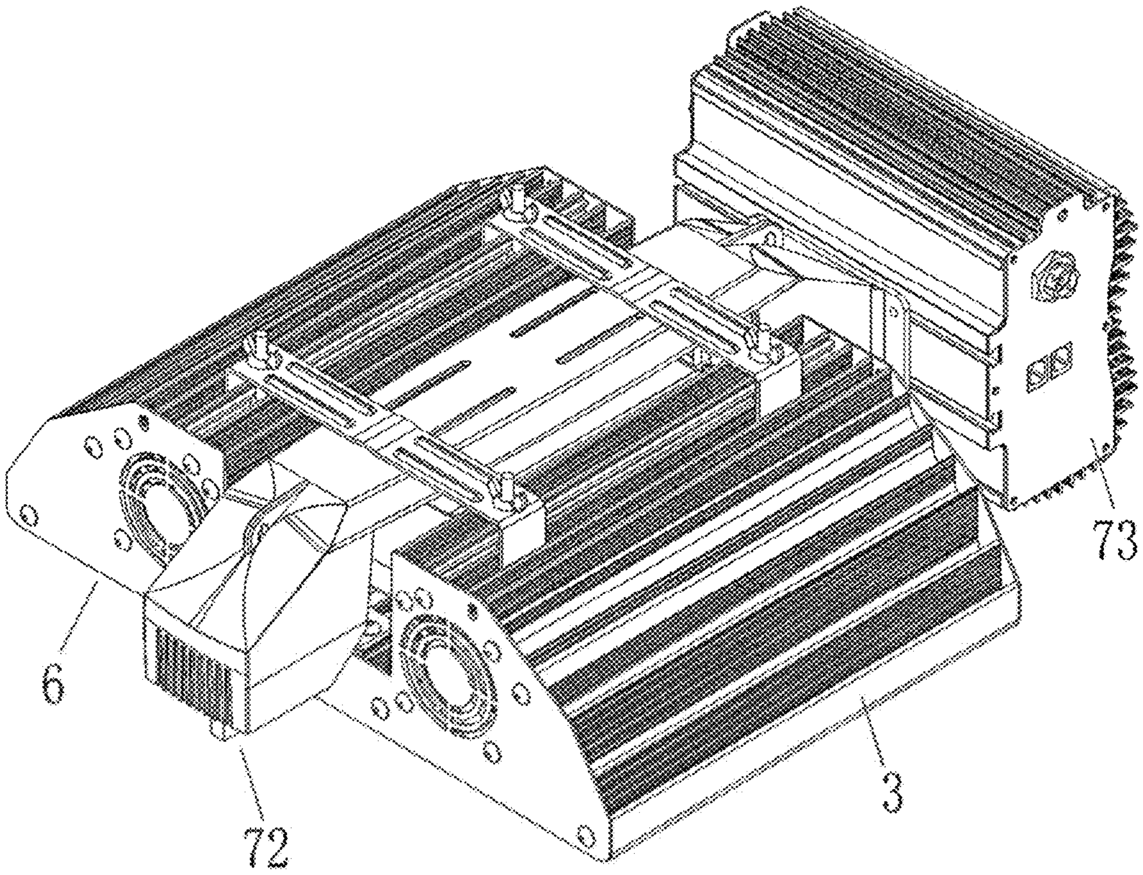
FIG. 1 is a schematic diagram of Embodiment 1 of the present disclosure.
Figure 2:
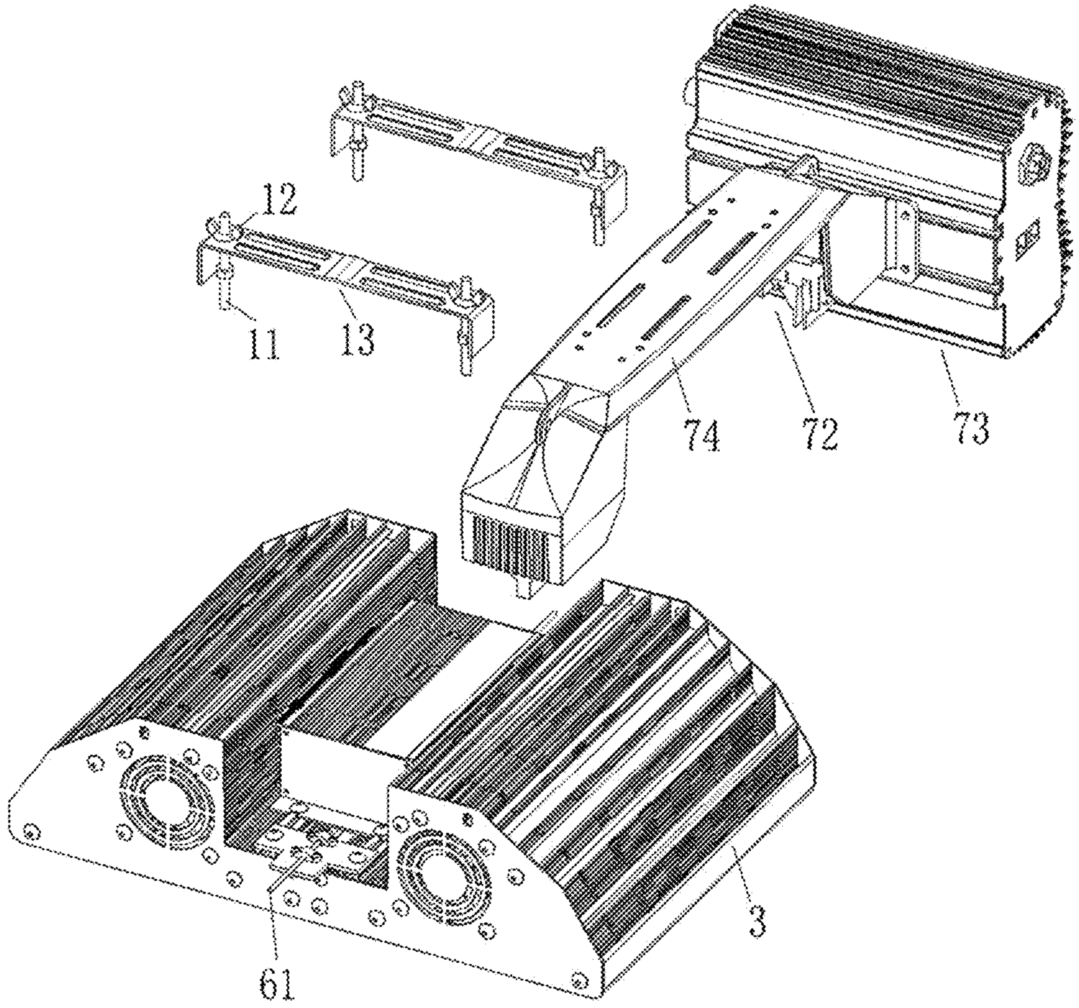
FIG. 2 is a schematic diagram of an exploded view of FIG. 1.

In the figures: 11. screw rod; 12. screw; 13. fixed support; 2. upper cover plate; 3. heat sink; 31. heat dissipation fin; 32. heat dissipation channel; 41. first side cover plate; 42. second side cover plate; 421. first ventilation opening; 43. third side cover plate; 431. first vent hole; 44. fourth side cover plate; 441. second vent hole; 442. second ventilation opening; 5. power supply assembly; 6. cold light source body; 61. wire; 62. lamp panel; 63. LED bead; 71. HID wiring lamp holder; 72. HPS wiring lamp holder; 73. electronic ballast; 74. lamp support; 8. end cover; 91. exhaust fan; and 92. suction fan.

DETAILED DESCRIPTION OF THE EMBODIMENTS

In the description of the present disclosure, it is to be understood that the terms “upper”, “lower”, “front”, “rear” “left”, “right”, “top”. “bottom”, “inner”, “outer”, etc. indicate azimuthal or positional relations based on those shown in the drawings only for ease of description of the present disclosure and for simplicity of description, and are not intended to indicate or imply that the referenced device or element must have a particular orientation and be constructed and operative in a particular orientation, and thus may not be construed as a limitation on the present disclosure. In addition, the terms “first” and “second” are for descriptive purposes only and should not be construed as indicating or implying relative importance.

In the description of the present disclosure, it should be noted that unless otherwise explicitly specified and defined, the terms “fixing”, “mounting”, “connecting”, “arranging”, etc. should be understood in a broad sense, for example, when an element is referred to as being “fixed to” another element, the element may be directly on another element or there can be a centered element. When an element is considered to be "mounted on" another element, the element may be directly on another element or there can be a centered element. When an element is referred to as being "connected to" another element, it may be a fixed connection, a detachable connection, or an integrated connection; may be a mechanical connection, or an electrical connection; may be a direct connection, or an indirect connection via an intermediate medium; and may be communication inside two elements.

For those of ordinary skill in the art, the specific meanings of the terms described above in the present disclosure may be interpreted according to specific circumstances.

The technical solutions in the embodiments of the present disclosure will be clearly and completely described below in combination with the accompanying drawings in the embodiments of the present disclosure. Apparently, the embodiments described are merely some rather than all of the embodiments of the present disclosure. Based on the embodiments of the present disclosure, all other embodiments obtained by those of ordinary skill in the art without making creative efforts shall fall within the protection scope of the present disclosure.

Embodiment 1

With reference to FIGS. 1-4, a light-emitting diode (LED) grow light with a cold light source, includes a cold light source body 6. The cold light source body 6 is fixed on a lamp support 74 of a high intensity discharge (HID) lamp (the HID lamp is not a limited name, but simply means that a lamp on which an existing HID bulb is installed is named as the HID lamp), and an electronic ballast 73 and two wiring lamp holders are arranged on the lamp support 74. The cold light source body 6 includes a cold light source and a heat sink 3, where the cold light source includes lamp panels 62 provided with a plurality of LED beads 63 and wires 61, and the wires 61 extend outward to the wiring lamp holders and are electrically connected to the electronic ballast 73. The heat sink 3 includes a housing and side cover plates located at both ends of the housing. Heat dissipation channels 32 are arranged in the housing, a plurality of heat dissipation fins 31 are arranged on the housing, and the lamp panel 62 is fixed at the bottom of the housing. An end cover 8 is installed at an input welding spot of the lamp panel 62, screw holes are machined at the top of the housing, each screw hole is connected to a screw rod 11, the screw rod 11 penetrates through the fixed support 13 and is fastened and connected by means of a screw 12, and the fixed support 13 is further connected to the lamp support 74.

The size of the lamp panel 62 and the arrangement and layout of the lamp beads are designed according to different power requirements, and an indispensable LED control circuit board and corresponding electrical components are arranged on the lamp panel 62, which is common knowledge and will not be repeated here. The heat sink 3 is made of aluminum or aluminum alloy, which has good heat conduction and dissipation effect. The electronic ballast 73 is fixed at one end of the lamp support 74 and serves as a source of power supply for the LED beads 63. The fixed support 13 is capable to simultaneously fix the lamp support 74 and the cold light source body 6 of the HID lamp, so as to achieve the assembly, installation and use of the LED cold light source and the HID lamp.

In this embodiment, when the wiring lamp holders are HPS (high-pressure sodium) wiring lamp holders 72, the wires 61 can be interchanged with bulbs of a high-pressure sodium lamp. When replacing an existing bulb, a user only needs to do like bulb installation, i.e., placing the wires 61 at both ends of the cold light source body 6 into the HPS wiring lamp holders 72.

Embodiment 2

Figure 5:
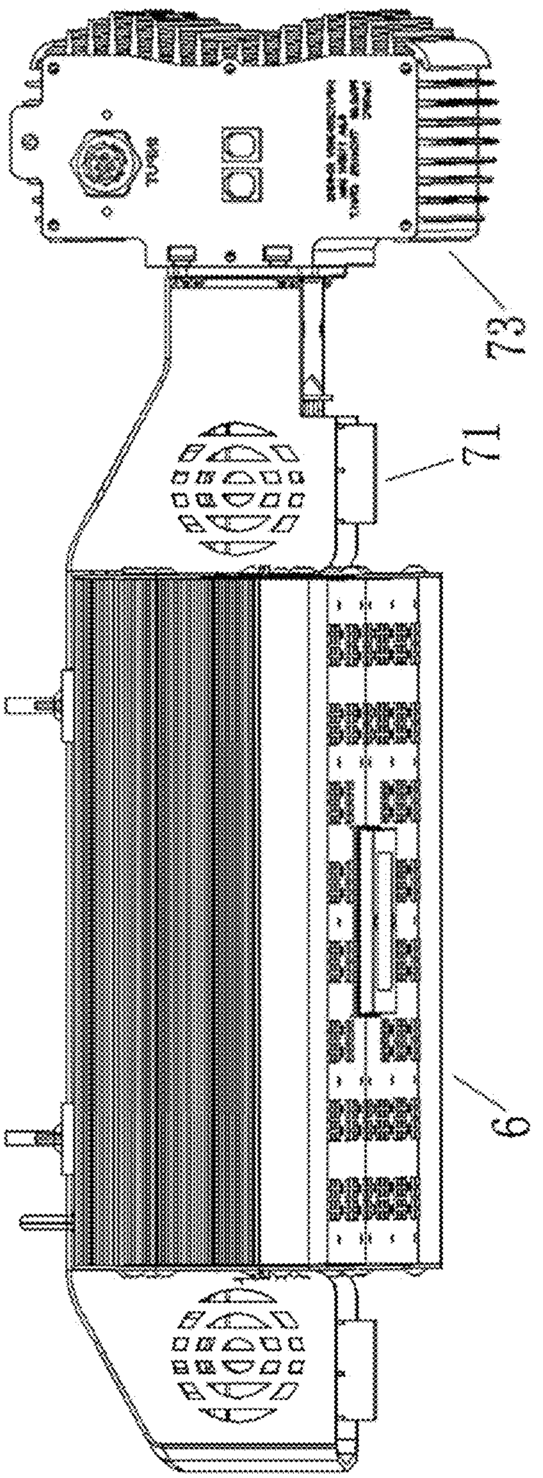
FIG. 5 is a front view of Embodiment 2 of the present disclosure.
Figure 6:
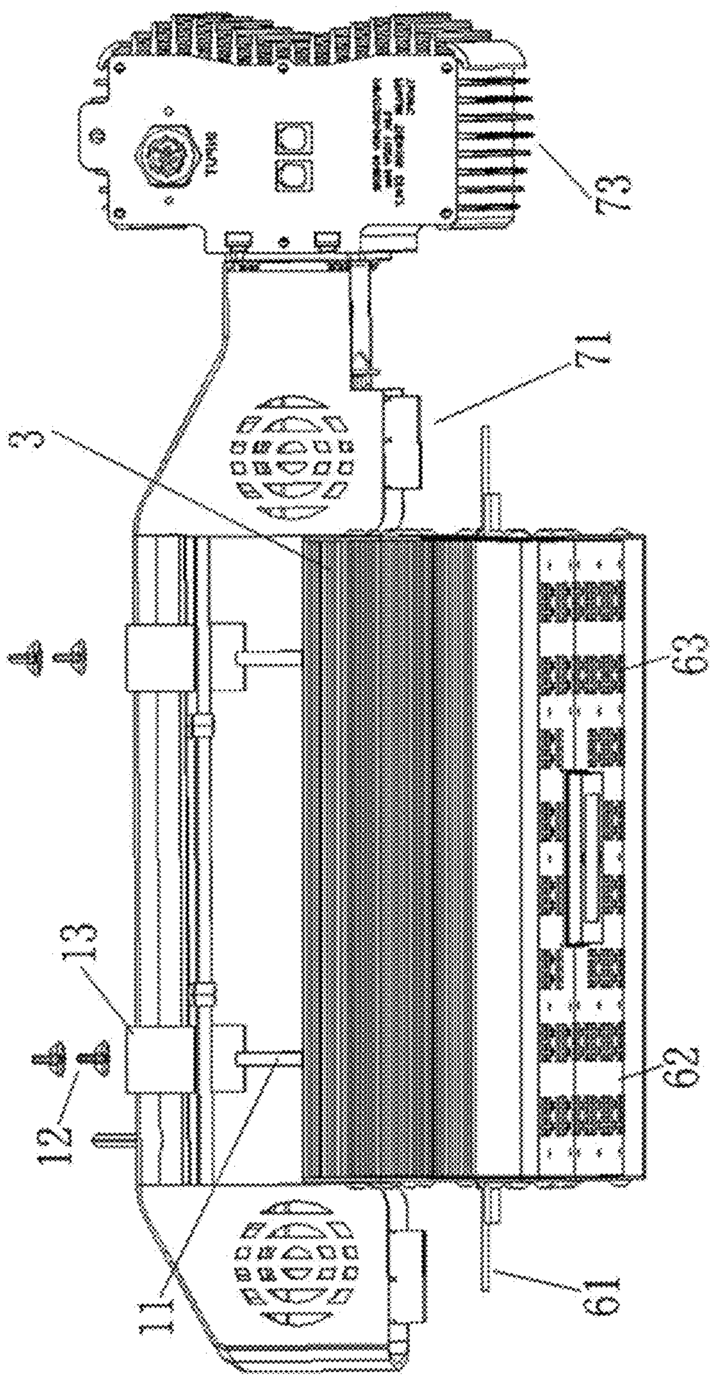
FIG. 6 is a schematic diagram of an exploded view of FIG. 5.

With reference to FIGS. 5-6, a light-emitting diode (LED) grow light with a cold light source is different from the technical solution of Embodiment 1 in that when wiring lamp holders are high intensity discharge (HID) wiring lamp holders 71 (including a plastic lamp holder and a ceramic lamp holder), wires 61 can be interchanged with HID bulbs. When replacing an existing bulb, a user only needs to do like bulb installation, i.e., placing the wires 61 at both ends of a cold light source body 6 into the plastic lamp holder or the ceramic lamp holder. The wires 61 are conversion lines with ultra-high properties such as corrosion resistance, high and low temperature resistance, high pressure resistance and structural stability.

Embodiment 3

Figure 7:
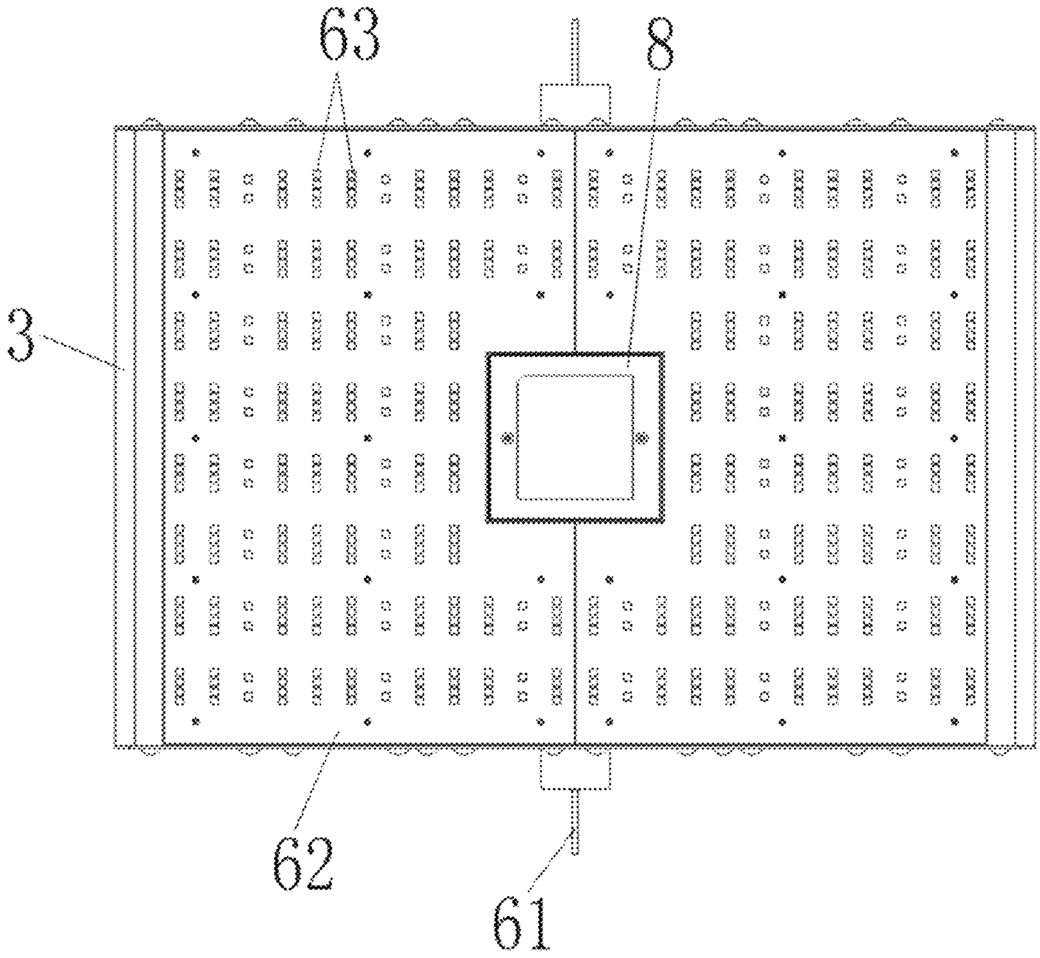
FIG. 7 is a bottom view of a cold light source body of the present disclosure.
Figure 8:
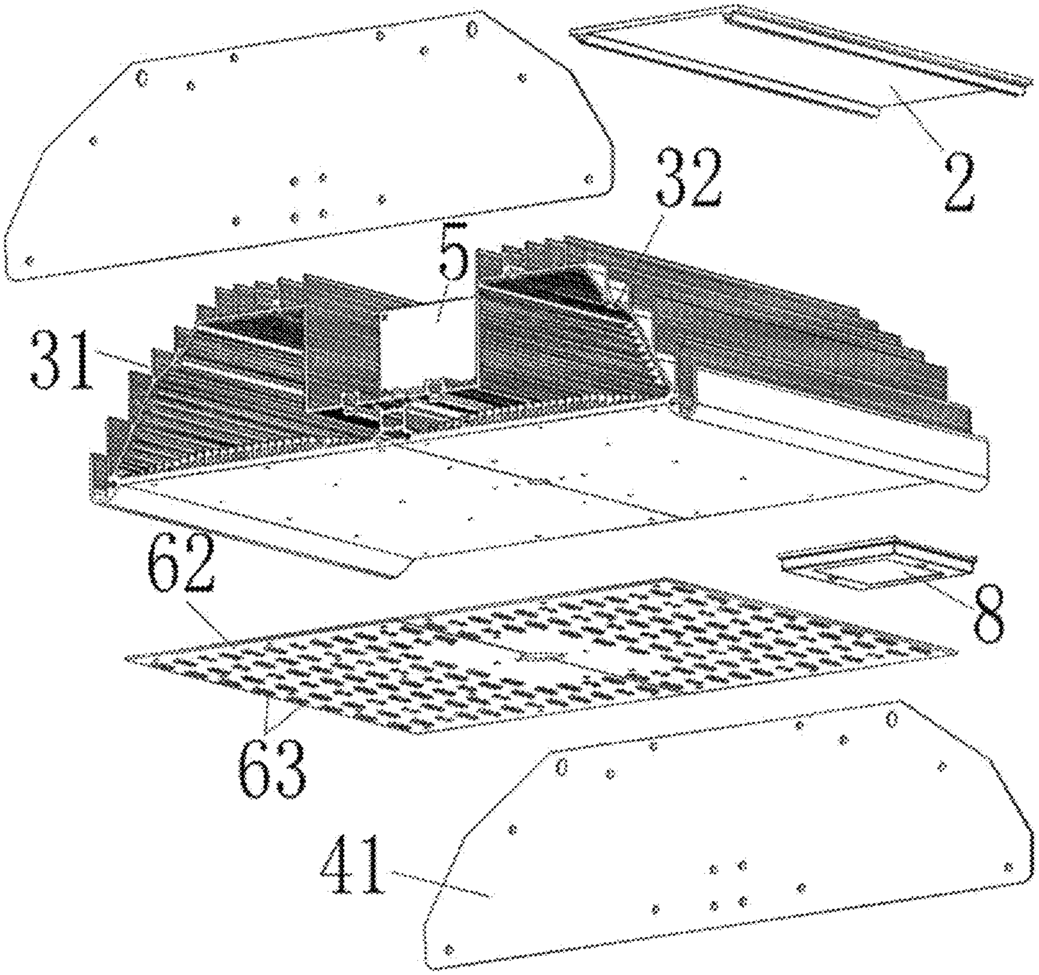
FIG. 8 is a schematic diagram of an exploded view of a first structural design in FIG. 7.

With reference to FIGS. 6-8, on the basis of the technical solutions of Embodiment 1 and Embodiment 2, a light-emitting diode (LED) grow light with a cold light source is provided. For a specific structure of a heat sink 3, the heat sink 3 includes a housing configured for enclosing a heat dissipation channel 32, and the heat dissipation channel 32 is a cavity body with openings at both ends. When the heat dissipation channel 32 is ventilated, air inter or outlet only from the openings at both ends is allowed. Heat dissipation fins 31 extend along the heat dissipation channel 32 inside the housing and extend vertically and outward side by side outside the housing to assist in heat dissipation. The openings at both ends of the heat dissipation channel 32 are respectively connected to side cover plates, and a power supply assembly 5 can be optionally installed on one side of the heat dissipation channel 32, where the power supply assembly 5 is provided with an upper cover plate 2, and the upper cover plate 2 and the top of the housing are slidably connected and fixed by abutting against two side cover plates. The end cover 8 is fixed between lamp panels 62. The power supply assembly 5 is provided with an indispensable LED control circuit board and corresponding electrical components, which is common knowledge and will not be repeated here.

Figure 4:
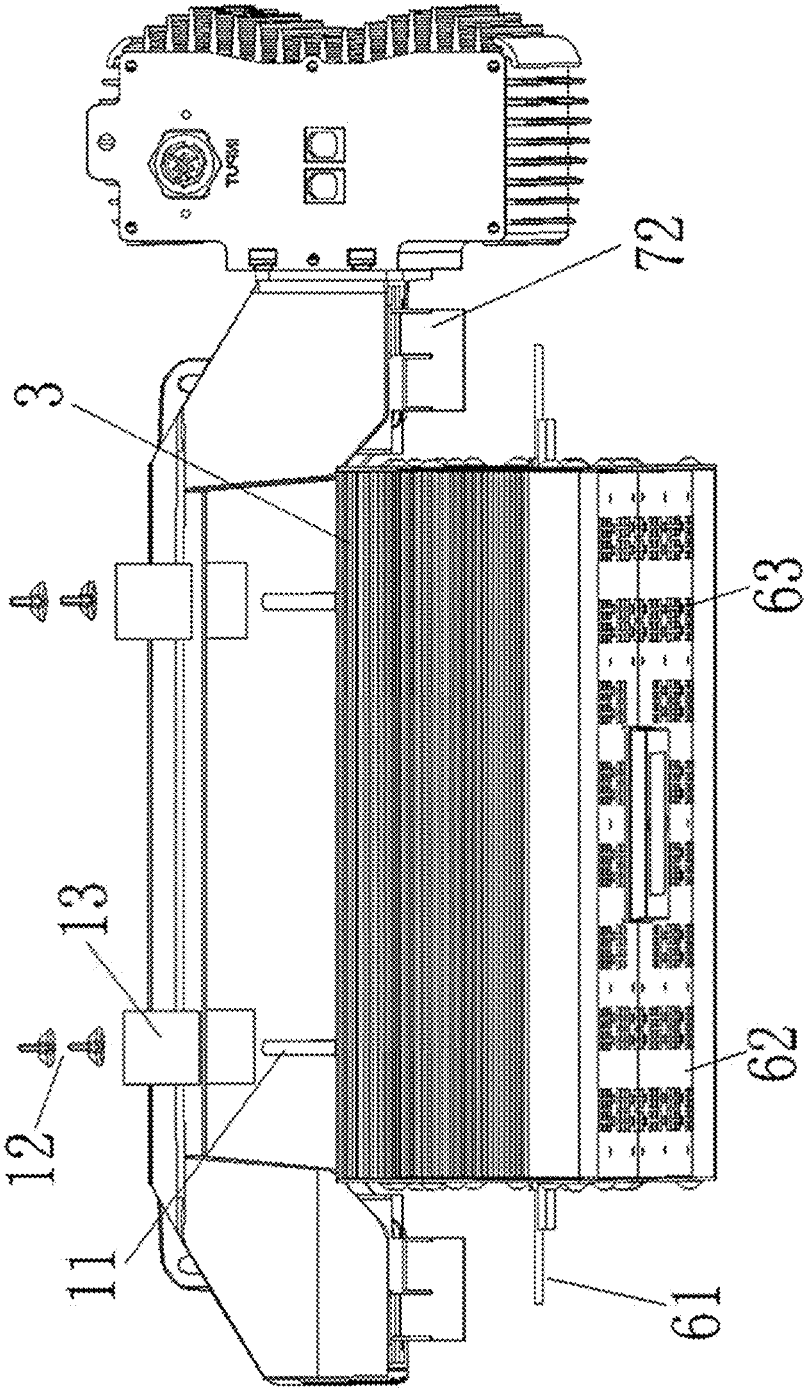
FIG. 4 is a schematic diagram of an exploded view of FIG. 3.

Screw holes are machined on the housing to install screw rods 11. First, a fixed support 13 is sinks in fit installation with the screw rod 11 fixed on the aluminum heat sink 3, and then a screw 12 is tightened manually to fasten the fixed support 13 to a cold light source body 6 to light up and use. As shown in FIG. 7, the end cover 8 is further arranged on the lamp panel 62, and the end cover 8 protects welding spots on the lamp panel 62. Further, as shown in FIGS. 4 and 6, the two wiring lamp holders are respectively located on both sides of the heat sink 3, the lamp panel 62 is provided with two wires 61 that extend outward respectively and are in fit with the wiring lamp holders in an inserted manner, and the cover plate is installed in a middle part of a joint of splicing between the two lamp panels 62, as shown in FIG. 6.

With reference to FIG. 8, a first structure of the side cover plates is designed in that the side cover plates are first side cover plates 41. For the composition and structure of the heat sink 3, the housing is composed of two half housings that are symmetrically arranged and spliced together, and the two half housings are enclosed to form an open slot through at both ends, where the power supply assembly 5 is fixed in the open slot. Further, the half housings are provided with a plurality of C-shaped grooves, and the side cover plate and the power supply assembly 5 are connected at the bottom through threads or riveted to the C-shaped groove. An axial direction of the C-shaped groove that matches the side cover plate is the same as a ventilation direction of the heat dissipation channel 32. According to design requirements, the C-shaped grooves can be designed inside and outside the half housings, the C-shaped grooves and through holes machined on the first side cover plates 41 are arranged to be opposite to each other to facilitate fixation by the screws 12 or connection by rivets. Further, generally, the screw holes are machined at the bottom of the open slot, and bolts or screws are used to connect the bottom of the power supply assembly 5 to the screw holes in a penetrating manner. For the joint of splicing between the two half housings, two C-shaped grooves are also used to form a through hole through which a power supply line can pass through, and the screw holes are also machined at the bottom of the half housing, to facilitate the connection to the lamp panel 62 by means of the screws 12.

Figure 3:
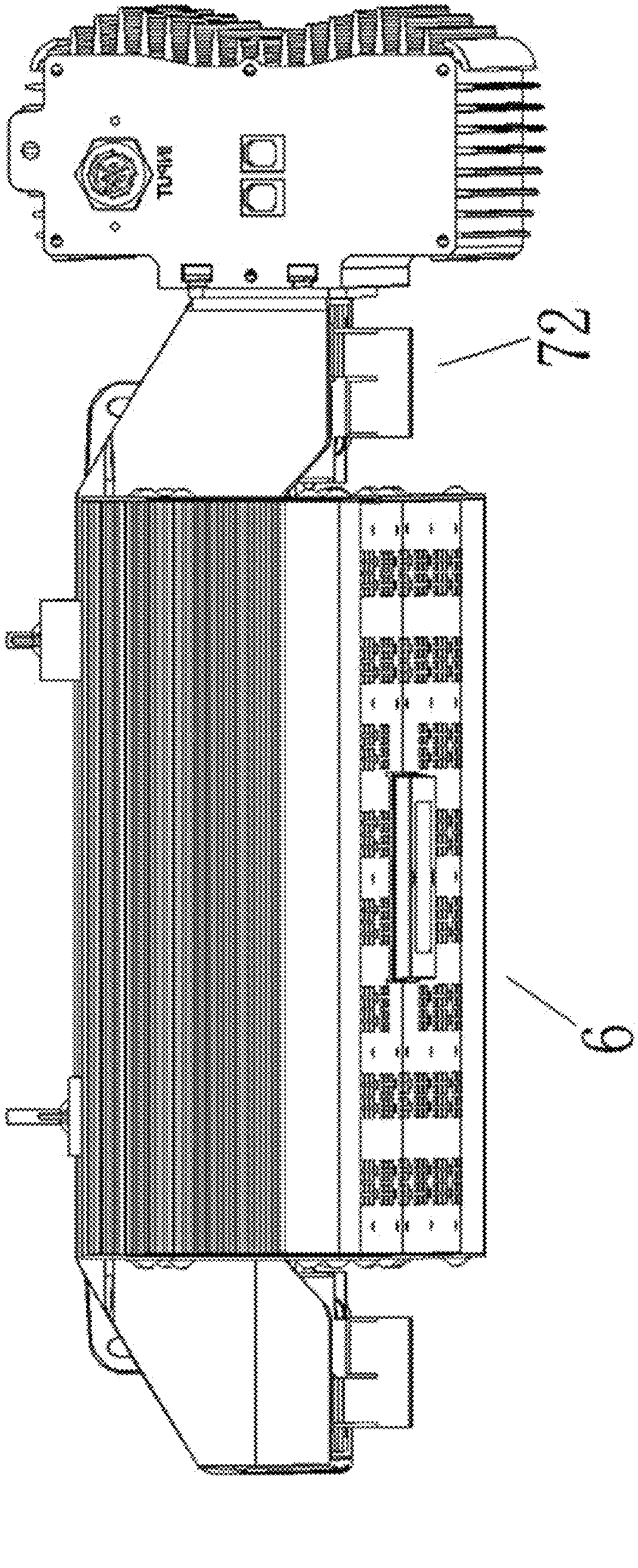
FIG. 3 is a front view of FIG. 2.

Further, the half housing is provided with the heat dissipation channel 32 with a combination of rectangular and trapezoidal cross-section shapes, and the heat dissipation fins 31 are plate elements or strip-shaped blocks that extend side by side along inside and outside of the half housing. As shown in FIG. 3, the heat dissipation fins 31 extend out of the plate elements vertically from outside of the half housing, and the top of a plate element near the open slot is shaped like an outward protruded portion. A C-shaped groove is arranged at the bottom of the upper cover plate 2, and the C-shaped groove is sleeved on a protruded portion of the top of the heat dissipation fin 31. Two first side cover plates 41 are fixed on a heat dissipation body and clamp the upper cover plate 2, the top of the open slot is closed, and the open slot also has the function of ventilation and heat dissipation because both ends of the open slot are through.

In this structural design, the heat sink 3 plays a basic role in heat dissipation for the power supply assembly 5 and the lamp panels 62. Good thermal conduction characteristics of the housing material, in combination with the design of the heat dissipation fins 31, increase a heat dissipation area, which can meet the design requirements of low-power grow lights, that is, when LED beads 63 on the lamp panels 62 are sparsely arranged, and there is no need to arrange additional vent holes or ventilation openings on the first side cover plates 41.

Figure 9:
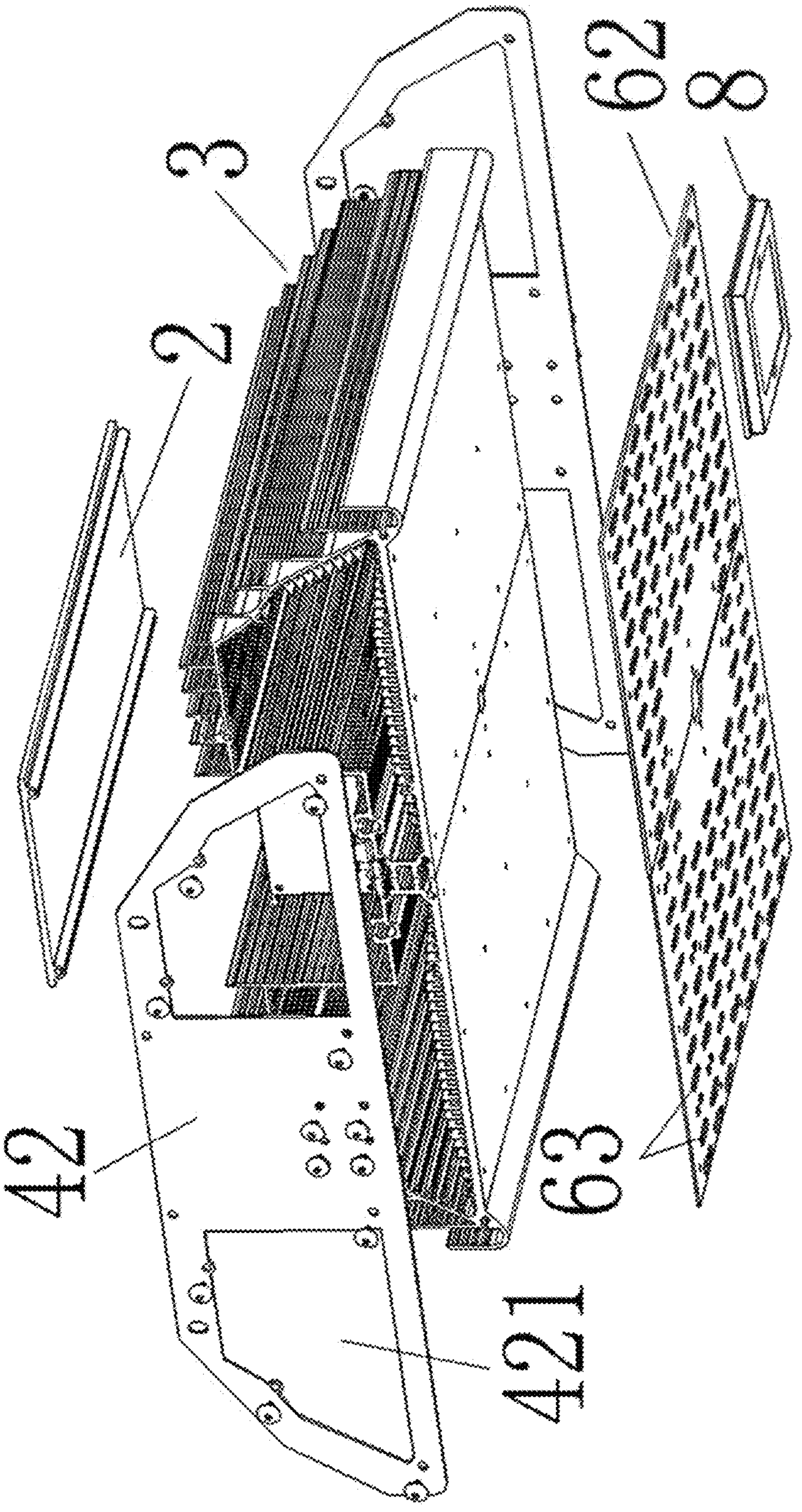
FIG. 9 is a schematic diagram of an exploded view of a second structural design in FIG. 7.

As shown in FIG. 9, a second structure of the side cover plates is designed in that the side cover plates are second side cover plates 42, through holes and first ventilation openings 421 are machined on the second side cover plates 42, and the first ventilation openings 421 and the heat dissipation channels 32 are matched in positions and sizes. The housing is composed of two symmetrically arranged half housings, and each half housing is provided with a heat dissipation channel 32, so that two first ventilation openings 421 need to be machined on the corresponding second side cover plate 42, where the first ventilation openings 421 are trapezoidal.

In this structural design, the heat sink 3 plays the basic role in heat dissipation for the power supply assembly 5 and the lamp panels 62. Good thermal conduction characteristics of the housing material, in combination with the design of the heat dissipation fins 31, increase the heat dissipation area. Due to addition of the first ventilation openings 421 on the second side cover plate 42, the heat dissipation capacity of the heat dissipation channel 32 is correspondingly improved, which can meet the design requirements of general-power grow lights.

Figure 10:
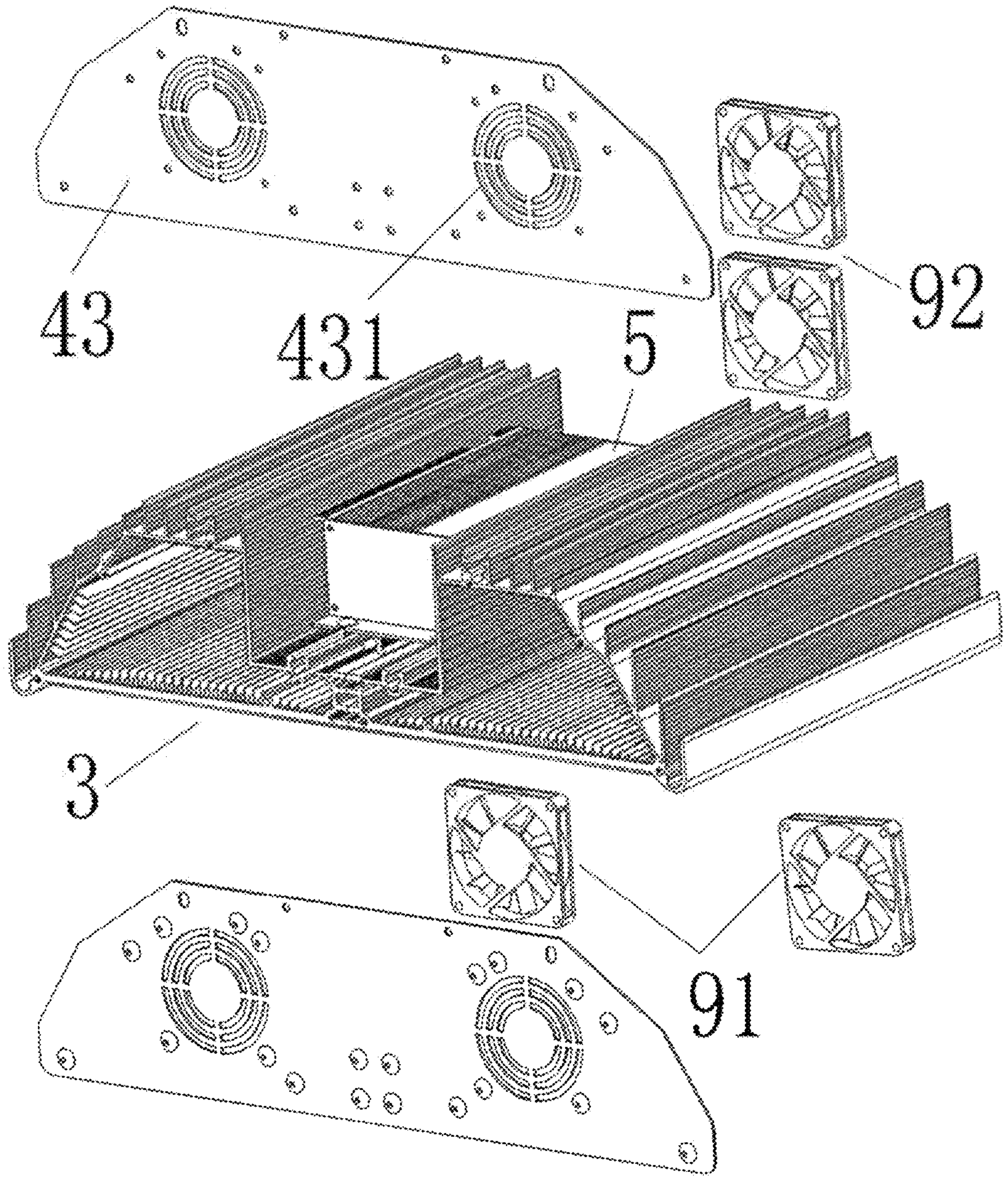
FIG. 10 is a schematic diagram of an exploded view of a third structural design in FIG. 7.

As shown in FIG. 10, a third structure of the side cover plates is designed in that the side cover plates are third side cover plates 43, through holes and first vent holes 431 are machined on the third side cover plates 43, the first vent holes 431 and the heat dissipation channels 32 are matched in positions, and suction fans 92 and/or exhaust fans 91 are fixed on the third side cover plates 43 at both ends of the heat dissipation channel, where the suction fans 92 and the exhaust fans 91 are electrically connected to the power supply assembly 5, and the power supply assembly 5 is located between the heat dissipation fins 31 to supply power to the fans. The housing is composed of two symmetrically arranged half housings, and each half housing is provided with a heat dissipation channel 32, so that two first vent holes 431 need to be machined on the corresponding third side cover plate 43, where the first vent holes 431 are intermittent annular grooves, which matches a blade coverage range of the fans. The installation design of the fans on the two third side cover plates 43 at both ends of the heat dissipation channel 32 can be implemented in the following three ways: first, two suction fans 92 are installed on one of the third side cover plates 43 to accelerate air suction into the heat dissipation channel 32; second, two exhaust fans 91 are installed on one of the third side cover plates 43 to accelerate discharge of air in the heat dissipation channel 32; and third, two suction fans 92 are installed on one third side cover plate 43, and two exhaust fans 91 are installed on the other third side cover plate 43, so that the air inside the heat dissipation channel 32 can be quickly subjected to heat exchange and discharged, resulting in the best heat dissipation effect. For the above three fan installation ways, it is necessary to pay attention to an installation direction of any fan to avoid affecting the ventilation and heat dissipation effect due to installation in an opposite direction.

In this structural design, the heat sink 3 plays the basic role in heat dissipation for the power supply assembly 5 and the lamp panels 62. Good thermal conduction characteristics of the housing material, in combination with the design of the heat dissipation fins 31, increase the heat dissipation area. Due to addition of the first vent holes 431 and the fans on the third side cover plate 43, when only the suction fans 92 or the exhaust fans 91 are opened, or both the suction fans 92 and the exhaust fans 91 are opened simultaneously, the heat dissipation capacity of the heat dissipation channel 32 can be greatly improved, which can meet the design requirements of high-power grow lights.

Figure 11:
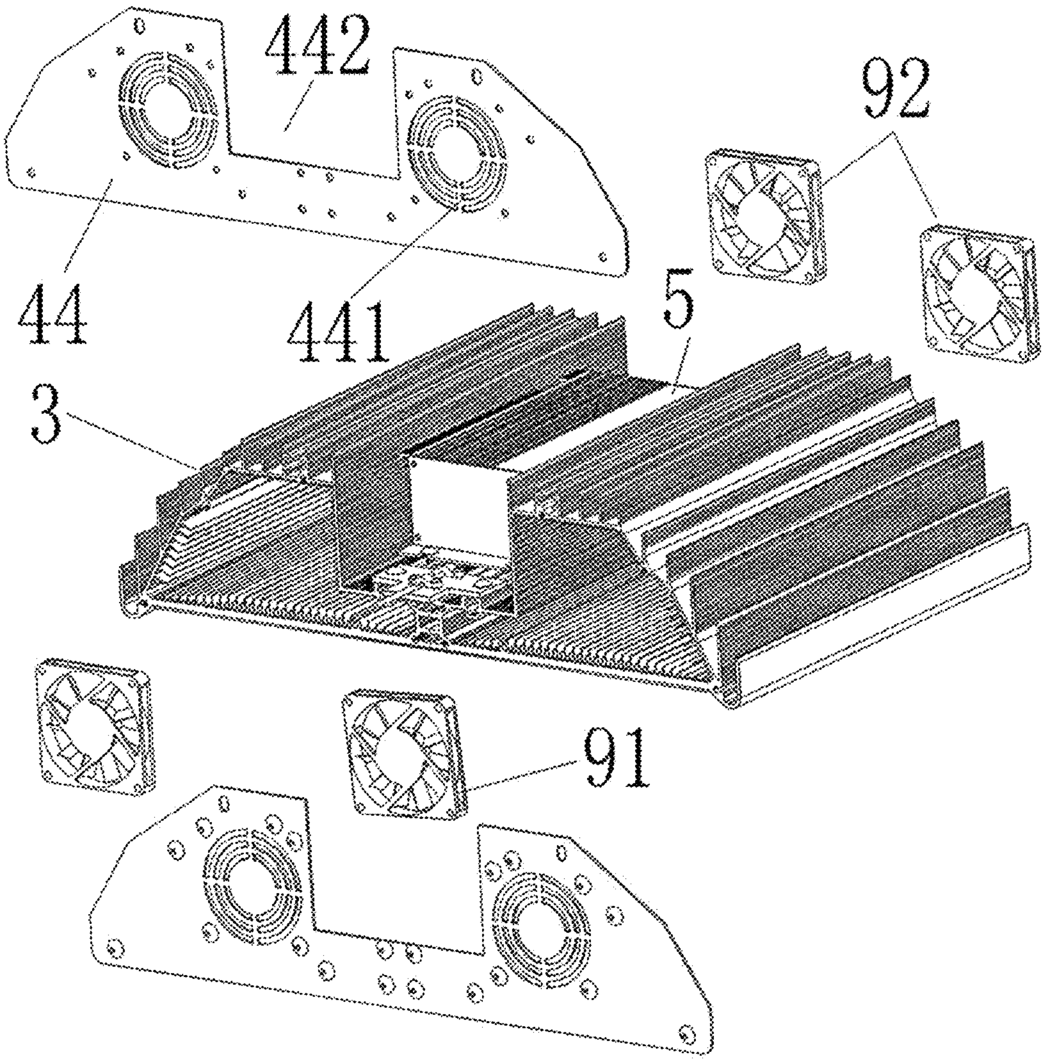
FIG. 11 is a schematic diagram of an exploded view of a fourth structural design in FIG. 7.

As shown in FIG. 11, a fourth structure of the side cover plates is designed in that the side cover plates are fourth side cover plates 44, through holes, second vent holes 441 and second ventilation openings 442 are machined on the fourth side cover plates 44, the second vent holes 441 and the heat dissipation channels 32 are matched in positions, and suction fans 92 and/or exhaust fans 91 are fixed on the fourth side cover plates 44 at both ends of the heat dissipation channel 32, where the suction fans 92 and the exhaust fans 91 are electrically connected to power supply assembly 5, and the second ventilation openings 442 and the power supply assembly 5 are matched in installation positions. As the upper cover plate 2 is installed on the open slot to form a ventilation channel, when the heat dissipation channels 32 on both sides assist the fans to accelerate ventilation and heat dissipation, air disturbance can also enhance the effect of ventilation inside the open slot, and the effect of good auxiliary heat dissipation for the power supply assembly 5 is achieved. The housing is composed of two symmetrically arranged half housings, and each half housing is provided with a heat dissipation channel 32, so that two second vent holes 441 need to be machined on the corresponding fourth side cover plate 44, where the second vent holes 441 are intermittent annular grooves, which matches a blade coverage range of the fans. The installation design of the fans on the two fourth side cover plates 44 at both ends of the heat dissipation channel 32 can be implemented in the following three ways: first, two suction fans 92 are installed on one of the fourth side cover plates 44 to accelerate air suction into the heat dissipation channel 32; second, two exhaust fans 91 are installed on one of the fourth side cover plates 44 to accelerate discharge of air in the heat dissipation channel 32; and third, two suction fans 92 are installed on one fourth side cover plate 44, and two exhaust fans 91 are installed on the other fourth side cover plate 44, so that the air inside the heat dissipation channel 32 can be quickly subjected to heat exchange and discharged, resulting in the best heat dissipation effect. For the above three fan installation ways, it is necessary to pay attention to an installation direction of any fan to avoid affecting the ventilation and heat dissipation effect due to installation in an opposite direction.

In the above embodiment, the heat sink 3 plays the basic role in heat dissipation for the power supply assembly 5 and the lamp panels 62. Good thermal conduction characteristics of the housing material, in combination with the design of the heat dissipation fins 31, increase the heat dissipation area. Because the second vent holes 441, the second ventilation openings 442 and the fans are added on the fourth side cover plate 44, and the second vent holes 441 and the fans are matched in positions, when only the suction fans 92 or the exhaust fans 91 are opened, or both the suction fans 92 and the exhaust fans 91 are opened simultaneously, the heat dissipation capacity of the heat dissipation channel 32 can be greatly improved. Furthermore, due to addition of the second ventilation openings 442 on the fourth side cover plate 44, the heat dissipation capacity of the open slot at the power supply assembly 5 is correspondingly improved, which can meet the design requirements of high-power grow lights.

For the device of the present disclosure, power of the LED cold light source can be customized according to user needs for high-pressure sodium (HPS) lamps and ceramic metal halide (CMH) lamps, that is, the size of the lamp panels 62 and the layout of the LED beads 63 can be designed according to different power requirements, to achieve compatibility with all HID BALLASTs and HID lamp supports on the market. Because the sizes of the LED cold light source (117.9±40/32±5/325.8±10/55.4±10) are designed based on the sizes and tolerances of the HID lamp support (85.1±40/34.8±5/318.1±10/60.8±10), so that the LED cold light source is compatible with all the HID lamps on the market, and the important size and tolerance range of the cold light source body 6 can be widely applied as a reference for standard common parts. Compared to existing bulb solutions, HID lamps with the LED beads 63 are more energy-efficient, and can better adapt to high and low temperature environments, without a phenomenon of glass bulb bursting due to any large temperature difference.

The device of the present disclosure involves the assembly and matching of various components and the selection of materials. The fans, the LED beads 63, the power supply assembly 5, and supporting circuit boards or control modules belong to the prior art or materials. Those skilled in the art can directly purchase or customize them from the market according to required product models and specifications.

The foregoing descriptions are merely preferred specific embodiments of the present disclosure, and common general knowledge such as well-known specific structures and characteristics in the solutions is not described too much herein. For those skilled in the art, it is apparent that the present disclosure is not limited to the details of the above-mentioned embodiments, and the present disclosure can be implemented in other specific forms without departing from the spirit or basic features of the present disclosure. Therefore, the embodiments should be regarded as illustrative and non-restrictive no matter from which point of view. Any equivalent substitutions or changes made by those skilled in the technical field according to the technical solution and the inventive concept of the present disclosure within the technical scope disclosed by the present disclosure shall fall within the scope of protection of the present disclosure.

What is claimed is:

1. A light-emitting diode (LED) grow light with a cold light source, comprising: a cold light source body; the cold light source body is fixed on a lamp support of a high intensity discharge lamp, and an electronic ballast and two wiring lamp holders are arranged on the lamp support; the cold light source body comprises a cold light source and a heat sink, wherein the cold light source comprises lamp panels provided with a plurality of LED beads and wires, and the wires extend outward to the wiring lamp holders and are electrically connected to the electronic ballast; and the heat sink comprises a housing and side cover plates located at both ends of the housing; heat dissipation channels are arranged in the housing, a plurality of heat dissipation fins are arranged on the housing, and the lamp panel is fixed at the bottom of the housing; and an end cover is installed at an input welding spot of the lamp panel, screw holes are machined at the top of the housing, each screw hole is connected to a screw rod, the screw rod penetrates through a fixed support and is fastened and connected by means of a screw, and the fixed support is further connected to the lamp support.

2. The LED grow light with a cold light source according to claim 1, wherein the side cover plates are first side cover plates, and through holes are machined on the first side cover plates.

3. The LED grow light with a cold light source according to claim 1, wherein the side cover plates are second side cover plates, through holes and first ventilation openings are machined on the second side cover plates, and the first ventilation openings and the heat dissipation channels are matched in positions and sizes.

4. The LED grow light with a cold light source according to claim 1, wherein the side cover plates are third side cover plates, through holes and first vent holes are machined on the third side cover plates, the first vent holes and the heat dissipation channels are matched in positions, and suction fans and/or exhaust fans are fixed on the third side cover plates at both ends of the heat dissipation channel, wherein when the suction fans are included, the suction fans are electrically connected to a power supply assembly; when the exhaust fans are included, the exhaust fans are electrically connected to a power supply assembly; and the power supply assembly is located between the heat dissipation fins.

5. The LED grow light with a cold light source according to claim 1, wherein the side cover plates are fourth side cover plates, through holes, second vent holes and second ventilation openings are machined on the fourth side cover plates, the second vent holes and the heat dissipation channels are matched in positions, and suction fans and/or exhaust fans are fixed on the fourth side cover plates at both ends of the heat dissipation channel, wherein when the suction fans are included, the suction fans are electrically connected to a power supply assembly; when the exhaust fans are included, the exhaust fans are electrically connected to a power supply assembly; and the second ventilation openings and the power supply assembly are matched in installation positions.

6. The LED grow light with a cold light source according to claim 5, wherein the housing is composed of two half housings that are symmetrically arranged and spliced together, and the two half housings are enclosed to form an open slot through at both ends, wherein the power supply assembly is installed in the open slot.

7. The LED grow light with a cold light source according to claim 6, wherein the half housings are provided with a plurality of C-shaped grooves, and the side cover plates and the power supply assembly are connected at the bottom through threads or riveted to the C-shaped grooves.

8. The LED grow light with a cold light source according to claim 7, wherein the half housings are provided with the heat dissipation channels with a combination of rectangular and trapezoidal cross-section shapes, and the heat dissipation fins are plate elements or strip-shaped blocks that extend side by side along inside and outside of the half housings.

9. The LED grow light with a cold light source according to claim 1, wherein the power supply assembly is provided with an upper cover plate, and the upper cover plate and the top of the housing are slidably connected and fixed by abutting against two side cover plates; and an end cover is installed in a middle part of the lamp panel.

10. The LED grow light with a cold light source according to claim 1, wherein the fixed support is connected to a middle part of the lamp support; and the two wiring lamp holders are respectively located on both sides of the heat sink, and the lamp panel is provided with two wires that extend outward respectively and are in fit with the wiring lamp holders in an inserted manner.

* * * * *